March 26, 1963 D. WOLFF 3,083,324
PHASE MODULATED POSITIONING SERVOSYSTEM
Filed Feb. 26, 1960 2 Sheets-Sheet 2

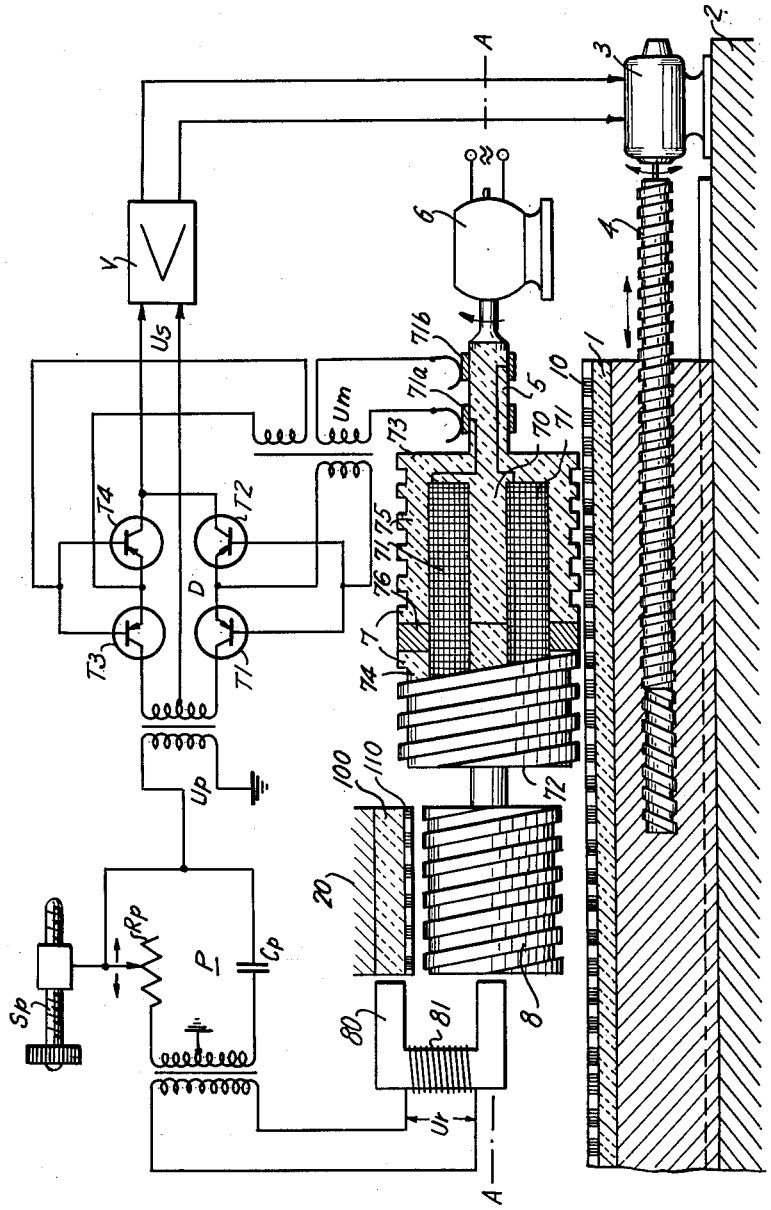

INVENTOR.
Dietrich Wolff
BY
Michael J. Striker
Attorney 3,083,324
PHASE MODULATED POSITIONING
SERVO-SYSTEM
Dietrich Wolff, Zurich, Switzerland, assignor to
Contraves AG., Zurich, Switzerland
Filed Feb. 26, 1960, Ser. No. 11,383
Claims priority, application Switzerland Feb. 26, 1959
9 Claims. (Cl. 318—28)

The present invention concerns an electromechanical device including a system for automatically measuring lengths for the purpose of determining the momentary position of one member relative to another member, particularly applicable to members of machine tools as a position control servosystem.

The invention concerns particularly a device of the type set forth which comprises a measuring member made of material capable of being permanently magnetized and having a longitudinally extending series of permanently magnetized portions of alternately opposed polarity and of uniform unit lengths, further comprising a scanning device comprising a rotary member provided with an external thread and made of magnetically permeable material, the pitch of the thread corresponding to the unit lengths of said magnetized surface portions of the measuring member. The threaded member is driven by a synchronous motor at a constant speed and is associated with a yoke member made of magnetically permeable material and carrying an induction coil so that the magnetic flux derived from the magnetized measuring member and passing through the threaded member and the yoke induces in the coil an alternating voltage in such a manner that the phase position of that alternating voltage within the area related to one of said units of length varies as a clearly defined function of the relative position of the scanning device with respect to the measuring member.

A device of the general type described above and particularly suited for the positioning of parts of machine tools has been described in principle in the French Patent No. 1,074,892.

In known devices of this type it is necessary to adjust two air gaps extending perpendicularly to each other and to maintain these air gaps at a constant dimension while the measuring member travels along the scanning device. One of these air gaps exists between the magnetized partly cylindrical longitudinal surface of the measuring member and the surface of the threaded member; the other air gap exists between the end surface of the yoke and the lateral surface of the longitudinally movable measuring member.

It is the main object of the present invention to eliminate the possibility of inaccuracies due to lack of precision of the above mentioned adjustments of the air gaps.

With the above objects in view, an electromechanical device for controlling the relative position of one member with respect to another member comprises, according to the invention, in combination, an elongated first member composed predominantly of magnetic material capable of permanent magnetization and provided with a longitudinally extending series of permanently magnetized surface portions of alternately opposed polarity and of uniform unit lengths, a second member comprising a rotary cylindrical body having an axis and being composed of two portions made of magnetically permeable material and a non-magnetic spacer separating said permeable portions, each of said permeable portions being provided on its cylindrical surface with a continuous helical ridge with a pitch equal to said unit length of said magnetized surface portions of said first member, the helical ridge of one of said portions being axially offset against the helical ridge of the other portion an amount equal $n.\frac{1}{2}p$; wherein $p$ is said pitch and $n$ is an uneven number including "1," said rotary cylindrical body being mounted with its axis extending parallel with said series of magnetized surface portions of said first member, said surface portions being spaced a short distance from the circumference of said helical ridges, yoke means of magnetically permeable material arranged to establish a magnetic circuit between said permeable portions of said rotary body, coil means mounted on said yoke means for generating an alternating voltage when said rotary body is rotated, drive means for rotating said rotary body at a predetermined speed, and operating means for moving one of said first and second members relatively to the other in direction of said axis while said rotary body is being rotated, whereby the phase position of said alternating voltage is varied in direct proportion to the amount of movement of one of said first and second members relative to each other.

The use of a rotary cylindrical body having two separate portions carrying a thread or helical ridge entails the remarkable advantage that the magnetic flux is taken over from the magnetized first member by one of the permeable portions of the rotary member, is caused to pass through the yoke means carrying the induction coil, and is then returned from the second permeable portion of the rotary member to the permanently magnetized first member in a closed magnetic circuit. In this manner, it is possible to maintain the air gap between the outer surface of the rotary body and the opposite partly cylindrical surface of the permanently magnetized first member at a constant dimension even while the permanently magnetized first member is moved in longitudinal direction a considerable distance. The air gap conditions, if there are any, in the magnetic circuit between the two permeable portions of the rotary body can be maintained at a constant value without any difficulty, particularly if the yoke is structurally combined with the permeable portions of the rotary member into one unit. Consequently, it is sufficient to provide for an arrangement in which the axis of rotation of the cylindrical rotary body remains parallel with the longitudinal direction of the permanently magnetized first member; more particularly, if the permanently magnetized surface of the first member is a cylindrical surface, then the just mentioned axis of rotation should coincide with the axis of the cylindrical surface of the first member. It has been found that small deviations of this alignment hardly affect the intended accuracy of the device.

One of the possible arrangements in the device consists in providing a rotary member with a hollow internal space in which the induction coil is mounted on an axially extending core which serves as the connecting yoke between two end plate members made also of magnetically permeable material and mounted in magnetic connection with the outer ends of the two permeable portions of the rotary member. This arrangement entails the advantage that the rotary member having two separate magnetic portions, together with the yoke and the coil mounted thereon are combined with each other to constitute a structural unit, whereby the space requirement is reduced to a minimum and avoidable air gaps are eliminated. It is true that this arrangement entails the necessity of providing contact rings connected with the terminals of the coil and arranged on the shaft of the rotary member in order to connect the coil with the pertaining electrical equipment. Also, in case the coil should be damaged or fail, it may be necessary to replace the entire rotary body.

If desired, the magnetic circuit between the two permeable portions of the rotary member may be established by an external yoke member carrying a coil.

A further improvement of the known devices of the type set forth consists, according to the invention, in the arrangement of a second threaded rotary member made of magnetically permeable material and mounted on the same shaft as the first mentioned rotary member, the pitch of the thread on the second rotary member being the same as the pitch of the helical ridge or thread of the first mentioned rotary member. However, the diameter of the second rotary member is smaller than that of the first mentioned rotary member, a stationary permanently magnetized measuring member, otherwise identical with the above mentioned permanently magnetized first member, being mounted adjacent to the second rotary member, the second permanently magnetized measuring member having the same magnetized surface portion of alternately opposed polarity and of the same uniform unit length as the first mentioned permanently magnetized member and cooperating with a second yoke member carrying a reference coil, a reference alternating voltage is produced in that reference coil upon rotation of the rotary bodies which reference voltage has the same frequency as the voltage induced in the first mentioned coil but it has a fixed phase position. This is of great advantage because in known devices the control voltage for the synchronous motor turning the main threaded rotary body has been used as the reference alternating voltage. It can be seen that in the case of varying loads in the circuit angular deviations of the operatively effective momentary positions of the rotary body as compared with the phase position of the control voltage of the synchronous motor will result in incorrect indications of the device and consequently in unsatisfactory performance. In contrast therewith, all such errors or inaccuracies are entirely avoided by the arrangement according to the invention.

A still further advantageous improvement of known devices of this type consists in the selection of materials. For instance, the permanently magnetized members may be made of ceramically sintered iron oxide powder, e.g., a non-metallic magnetically permeable material made by Philips and known by the trade name Ferroxcube. This material possesses high permeability and low coercive force, while having high specific resistance and avoiding eddy current losses without the necessity of lamination. Since, however, this type of material cannot be permanently magnetized, it is suggested according to this invention to apply to the longitudinally extending operative surface, which is ground cylindrically and co-axially with the axis of rotation of the rotary body, a magnetizable layer of predetermined thickness. This layer may consist of a casting resin for instance, an epoxy casting resin made by Ciba and known under the trade name Araldit, which has particularly suitable electrical and mechanical characteristics, and the mass of casting resin contins a power of magnet iron capable of permanent magnetization distributed in the resin.

Since it has been found that even a measuring member consisting of a bar of homogenous magnetic material is magnetized only to a depth of about 0.2 mm. so that the main body of that bar will only serve to close the magnetic circuit for the magnetic flux, it is of advantage to make the main body of the measuring member of material highly capable of being permanently magnetized and to provide only a rather thin magnetizable outer layer which ,however, is substantially thicker than the magnetizable layers containing lacquer and iron powder and conventionally used on tapes for sound recording because the conventional materials containing lacquer and iron powder as used for the above mentioned tapes could not be applied with the required homogeneity and consistency with a layer thickness of 0.2 mm., the use of an epoxy casting resin as a binder is preferable. The above mentioned favorable permeability and resistivity characteristics of ceramically sintered iron oxide material makes it advisable to use this material for all the magnetically permeable portions of the scanning device, particularly of the permeable portions of the rotary body.

A particularly useful and preferred application of the device according to the invention is characterized by a phase shifter device which is controlled on the basis of a predetermined program, e.g. by means of perforated cards, said phase shifter being designed to shift the phase position of the above mentioned reference alternating voltage in accordance with a predetermined control program. This phase shifter cooperates with a phase synchronizer which is designed to produce a control voltage for a servomotor controlling the movements of the measuring member, said control voltage corresponding regarding sign and amplitude to the alternating voltage furnished by the scanning device, in such a manner that the difference between the above metnioned phases tends to decrease toward the value 0.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic, partly sectional illustration of one embodiment of the invention;

Figure 3:
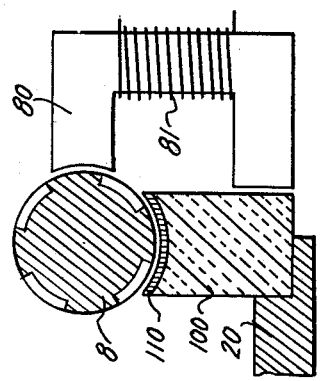
FIG. 3 is a transverse, partly sectional diagrammatic illustration of the device for producing the reference alternating voltage.

As can be seen from FIGURE 1, a first member or measuring bar 1 made of ceramically sintered iron oxide material is mounted on a support 1', movable in longitudinal direction on a machine base 2. A lead screw 4 which is driven by a servomotor 3 is in engagement with an internal thread of the assembly 1, 1' so that the member 1 will be moved forward or backward depending upon the direction of rotation of the lead screw 4.

The member 1 has a substantially rectangular cross section, its upper surface however being ground to concave cylindrical shape having an axis parallel with the direction of movement of member 1, as can be seen from FIGURE 3, although the latter illustrates the measuring member 100 which is stationary and will be described below, but otherwise is substantially identical with the member 1. The above mentioned ground concave cylindrical surface is provided with a layer 10 or 110, respectively, of predetermined thickness and composed of epoxy casting resin containing dispersed magnet iron powder, said layer being magnetizable and having a series of permanently magnetized surface portions of alternately opposed polarity and of uniform unit lengths. For the purpose of illustration, those surface portions which are magnetized to constitute a north pole are shown in the layer 10 by vertical cross hatching, while the south pole portions therebetween are left white (see also FIGURE 2).

The axis of the concave cylindrical surface of the above described surface of the layers 10 or 110, respectively, coincides with the axis of rotation A—A of a shaft 5 rotatably supported by means, not shown, in the machine. The shaft 5 is driven by a synchronous motor 6 supplied with alternating voltage, at a constant rotary speed. The shaft 5 carries as a main scanning member a rotary body 7. This rotary body comprises an axially arranged core rod 70 which carries a cylindrical coil 71 the terminals of which are connected with two contact rings 71a, 71b mounted on the shaft 5. The ends of the core rod 70 are firmly connected (FIG. 2) with end plate members 72, 73, respectively, made also of highly permeable ceramically sintered iron oxide material, and the end plate members 72, 73 are similarly connected with two coaxial hollow cylindrical portions 74, 75 made of the same material. The outer surfaces of these two portions 74, 75 are provided with a thread, i.e. with helical ridges the pitch of which corresponds exactly to the unit lengths of two oppositely polarized surface portions of the member 1. However, the helical ridges or threads of the portion 74 are axially offset with respect to the otherwise identical threads or helical ridges of the portion 75 by an amount which is equal to, or an uneven multiple of, ½ pitch thereof. This can be seen in FIG. 2 where the spacer member 76 has a thickness equal to the pitch of said thread. In the position of the members of the device as illustrated in FIG. 1, the magnetized surface portions having north polarity of the member 1 are located exactly opposite the helical ridges of the portion 74, while the helical ridges of the portion 75 are located opposite the oppositely polarized portions of the member 1. The spacer ring 76 separating the portions 74 and 75 is made of non-magnetic material, e.g. brass. Thus, it can be assumed that a magnetic circuit is provided for the magnetic flux emanating from the south pole portions to the north pole portions of the member 1 and this means that this flux is taken by the portion 75 of the south pole portion of the layer 10, passes through the end plate member 73 to the core 71 and from there through the end plate 72 and the portion 74 to the north pole portions of the layer 10. The circuit is completely closed by the body of the member 1. If now the rotary body is caused to rotate about its axis A—A at constant speed while the member 1 is standing still, then an alternating voltage of constant amplitude and frequency is induced in the coil 71 and appears at the contact rings 71a, 71b. As soon as the member 1 is shifted in longitudinal direction by operation of the servomotor 3, the phase position of the alternating voltage produced by the coil 71 is changed in a clearly defined rectilinear function of the amount of such shift of the member 1. The shaft 5 carries also a single threaded member 8 made also of magnetically permeable material and provided with a thread or helical ridge of the same pitch as the threads on the portions 74 and 75 of the body 7, but having a smaller diameter than the latter.

The threaded member 8, in the arrangement shown diagrammatically in FIGURE 1 but more precisely in FIGURE 3, cooperates with a reference member 100 which has a concave cylindrical surface of the same type as the member 1 and carries a layer 110 which is alternately magnetized with opposite polarities over surface portions of the corresponding unit lengths. This reference member 100 is stationarily mounted on a stationary member 20 of the machine. A yoke member 80 carrying a reference induction coil 81 carries the magnetic flux appearing across the reference member 100 and the member 8 back to the member 100. Consequently, a reference alternating voltage Ur of constant amplitude and of the same frequency as the main alternating voltage Um is induced in the coil 81. The phase position of the reference voltage Ur remains unchanged no matter how the member 1 is moved.

A phase shifter device P can be controlled according to a predetermined program. The device P is diagrammatically illustrated in FIGURE 1 by an impedance circuit including a fixed capacity Cp and a variable resistance Rp which is variable by turning the screw Sp. In this manner, an alternating voltage Up can be produced which is phase-shifted with respect to Ur in accordance with a certain program, said voltage Up being applied to a phase comparator D which comprises four transistors T1, T2, T3, T4 in an arrangement as illustrated, said transistors being influenced by the primary alternating voltage Um in such a manner that a control direct current Us is created which corresponds regarding its sign and amplitude to the momentary sign and value of a phase difference between the alternating voltage Um and the arbitrary phase-shifted alternating voltage Up. The control D.C. voltage Us controls the servomotor 3 via a D.C. amplifier V in such a manner that the lead screw 4 is turned and the member 1 is shifted in one or the other direction until the control voltage Us, i.e. the phase difference between voltages Um and Up reaches the value 0. Therefore the adjustment of the phase shifter P according to an arbitrary program results automatically in a corresponding shift of the member 1, which means that in this manner a machine member can be positioned according to the predetermined program. It has been found that the accuracy of such an adjustment of a controlled machine member can be carried out with an accuracy of at least 1μ.

Figure 4:
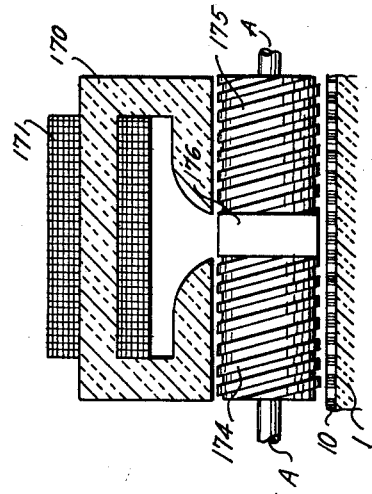
FIG. 4 illustrates a modification of the scanning device illustrated in FIG. 1.
Figure 2:
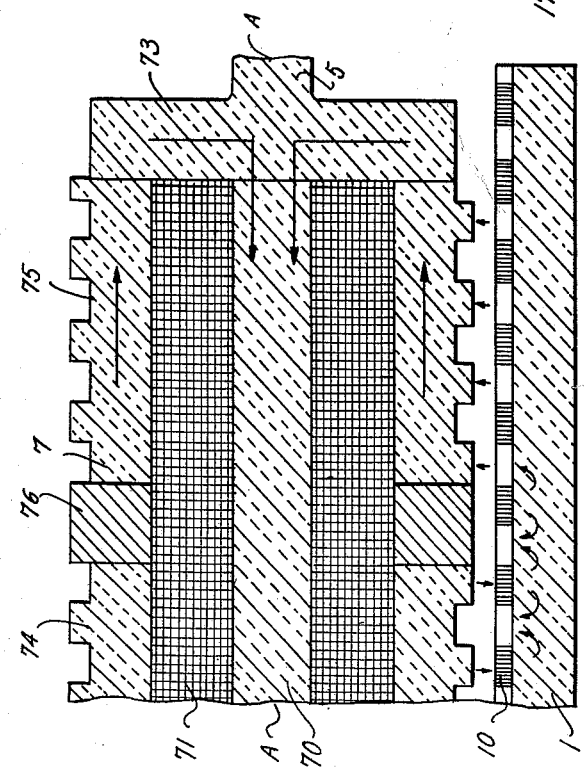
FIG. 2 is a fractional sectional view of certain elements of FIG. 1.

The modification illustrated in FIGURE 4 differs from the example depicted by FIGURES 1 and 2 in that the rotary member has two threaded portions 174 and 175 separated by a spacer ring 176, an external yoke member 170 being associated with the rotary unit 174–176 by being positioned adjacent to the latter as illustrated, an induction coil 171 being mounted on the yoke member 170. The function and operation of the arrangement according to FIGURE 4 is otherwise identical with that described above.

The operation of the above described arrangement is as follows. The motor 6 which is connected to some power supply, e.g. A.C. supply, and which is supposed to rotate at a constant speed is switched on. Hereby the rotary body 7 together with its extension 8 is caused to rotate at a uniform speed. As long as the movable support member 1′ carrying the measuring bar 1 with its magnetized layer 10 is at a standstill or in a certain position relative to the base 2, the rotation of the member 7 will produce, as described above, an alternating voltage Um at a frequency depending upon the rotary speed of the rotary member 7. At the same time a reference voltage Ur is produced in the coil 81 due to the rotation of the member 8 in relation to the stationary magnetized layer 110. The arrangement is such that the frequency of the reference voltage Ur is the same as the frequency of the above-mentioned voltage Um.

The reference voltage Ur is supplied to a phase shifter arrangement P which comprises a capacitor Cp and a variable resistor Rp. By operation of the adjustment screw Sp the movable tap of the variable resistor can be adjusted along the latter so as to change the phase of the introduced reference voltage Ur. Consequently, a phase-shifted reference voltage Up can be derived from the phase-shifter arrangement P, the phase shift depending entirely from the adjustment of the variable resistor Rp and entirely independent of the phase of the voltage Um. The voltage Up is fed into a phase discriminator arrangement D as described above, which is also supplied, for the purpose of comparison, with the above mentioned voltage Um. Consequently, the phase discriminator arrangement D furnishes a direct current voltage Us which is zero if and when the modified reference voltage Up is in phase with the voltage Um. However, if and when the phase of one or the other of the just mentioned voltages trails or leads the other one, then the output voltage Us will be positive or negative, as the case may be. After amplification through the amplifier V this direct current voltage Us is applied to the servo motor 3 which drives the lead screw 4.

It can be seen that if the movable support member 1′ is in such a position that there is a positive or negative phase difference between the voltages Um and Up the resulting output voltage Us will cause the direct current servomotor 3 to turn the lead screw 4 in one or the other direction and thereby move the support 1′ in the corresponding direction relative to the base 2 until phase equality is established. On the other hand, if a certain adjustment of the relative position of the support member 1′ relative to the base 2 is desired it is only necessary to operate the adjustment screw Sp for changing the phase of the modified reference voltage Up. The result will be that the support member 1′ will automatically be moved in the manner described above to a position in which again phase equality between U$m$ and U$p$ is re-established. In other words, by operating the phase shifter arrangement P a desired precise movement of the support member 1' can be effected.

It will be understood that each of the elements described above, or two or more together, may also find a useful application in other types of electromechanical devices for controlling relative positions of two members differing from the types described above.

While the invention has been illustrated and described as embodied in electromechanical devices for controlling the relative positions of two members by the cooperation of a permanently magnetized first member with a rotary threaded body of magnetically permeable material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electromechanical device for controlling the relative position of one member with respect to another member, in combination, an elongated first member composed predominantly of magnetic material capable of permanent magnetization and provided with a longitudinally extending series of permanently magnetized surface portions of alternately opposed polarity and of uniform unit lengths; a second member comprising a rotary cylindrical body having an axis and being composed of two portions made of magnetically permeable material and a non-magnetic spacer separating said permeable portions, each of said permeable portions being provided on its cylindrical surface with a continuous helical ridge with a pitch equal to two of said unit lengths of said magnetized surface portions of said first member, the helical ridge of one of said portions being axially offset against the helical ridge of the other portion an amount equal $n.\frac{1}{2}p$ wherein $p$ is said pitch and $n$ is an uneven number including "1," said rotary cylindrical body being mounted with its axis extending parallel with said series of magnetized surface portions of said first member, said surface portions being spaced a short distance from the circumference of said helical ridges; yoke means of magnetically permeable material arranged to establish a magnetic circuit between said permeable portions of said rotary body; coil means mounted on said yoke means for generating an alternating voltage when said rotary body is rotated; drive means for rotating said rotary body at a predetermined speed; and operating means for moving one of said first and second members relatively to each other in direction of said axis while said rotary body is being rotated, whereby the phase position of said alternating voltage is varied in direct proportion to the amount of movement of one of said first and second members relative to each other.

2. A device as claimed in claim 1, wherein said rotary body is a hollow cylindrical body and comprises two end plate members of magnetically permeable material attached thereto, said spacer being an annular member, said yoke means being mounted in the form of an axial core rod within said hollow body and connected at its ends with said end plate members respectively, and said coil means being mounted on said core and within said hollow body.

3. A device as claimed in claim 1, including, a second rotary cylindrical body coaxially connected with said first mentioned rotary body and being made of magnetically permeable material, said second body being provided on its cylindrical surface with a continuous helical ridge with a pitch equal to that of said helical ridge on said permeable portions of said first mentioned rotary body; an elongated third member composed predominantly of magnetic material capable of permanent magnetization and provided with a longitudinally extending series of permanently magnetized surface portions of alternately opposed polarity and of uniform unit lengths equal to said pitch of said helical ridges, said third member being mounted adjacent to and parallel with said second rotary body; second yoke means of magnetically permeable material arranged to establish a magnetic circuit between said second rotary body and said third member, said yoke means and said third member being mounted stationarily with respect to one another and with respect to the mounting of said first mentioned rotary body; and second coil means mounted on said second yoke means for generating a reference alternating voltage of unvariable phase position with respect of the rotation of said rotary bodies when the latter are rotated.

4. A device as claimed in claim 3, wherein said first and third elongated members are made of ceramically sintered iron oxide material and have a longitudinally extending cylindrically concave face portion located opposite said first and second rotary bodies, respectively, said face portion being covered with a layer of casting resin containing dispersed magnet iron powder capable of permanent magnetization.

5. A device as claimed in claim 3, wherein said permeable material in said rotary bodies and in said yoke means is a ceramically sintered iron oxide material.

6. A device as claimed in claim 1, wherein said yoke means is mounted outside of said rotary body and includes one portion carrying said coil means and two portions extending parallel with and adjacent to said permeable portions, respectively, at a small spacing therefrom, said two portions of said yoke means being spaced from each other in the area opposite said non-magnetic spacer separating said permeable portions.

7. A device as claimed in claim 3, wherein said operating means include motor means operatively connected with one of said first and second members for moving said one of said members in either one of two opposite directions parallel with said axis of said rotary body, adjustable phase shifter means in circuit with said second coil means delivering at its output a modified alternating reference voltage having a phase position arbitrarily varied with respect to said phase position of said reference voltage generated by said second coil means, phase comparator and rectifier means connected between said output of said phase shifter means and said first mentioned coil means for producing a direct current control voltage proportional in sign and amplitude to any existing phase difference between said modified alternating reference voltage and said alternating voltage generated by said first mentioned coil means, the output of said rectifier means being connected with said motor means in such a manner that depending on the sign and amplitude of said control voltage said motor means is caused to move said one of said first and second members relatively to the other one thereof in a direction towards a position in which said phase difference and therefore said control voltage are reduced to zero.

8. A device as claimed in claim 7, wherein said first and third elongated members are made of ceramically sintered iron oxide material and have a longitudinally extending cylindrically concave face portion located opposite said first and second rotary bodies, respectively, said face portion being covered with a layer of casting resin containing dispersed magnet iron powder capable of permanent magnetization, and wherein said permeable material in said rotary bodies and in said yoke means is a ceramically sintered iron oxide material.

9. A device as claimed in claim 7, including programmatically variable control means for adjusting said phase shifter means for producing a desired amount of phase shift in said modified alternating reference voltage.

References Cited in the file of this patent

FOREIGN PATENTS 1,074,892  France ------------------ Apr. 7, 1954